(12) United States Patent
Campbell et al.

(10) Patent No.: US 7,261,220 B2
(45) Date of Patent: Aug. 28, 2007

(54) CORDLESS DC CAULK GUN

(75) Inventors: David C. Campbell, Bel Air, MD (US); Daniel P. Valenti, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 336 days.

(21) Appl. No.: 10/929,360

(22) Filed: Aug. 27, 2004

(65) Prior Publication Data
US 2006/0043120 A1    Mar. 2, 2006

(51) Int. Cl.
B67D 5/46   (2006.01)
B67D 5/54   (2006.01)

(52) U.S. Cl. .................. 222/61; 222/326; 222/387; 222/389

(58) Field of Classification Search .............. 222/61, 222/63, 326, 327, 333, 389, 258, 261, 262, 222/263, 387
See application file for complete search history.

(56) References Cited

U.S. PATENT DOCUMENTS

| | | | |
|---|---|---|---|
| 2,818,999 A | 1/1958 | Miller | |
| 3,138,303 A | 6/1964 | Hoveland | |
| 3,308,998 A | 3/1967 | Oppasser et al. | |
| 3,568,892 A | 3/1971 | Burk | |
| 3,587,930 A | 6/1971 | Schultz | |
| 3,640,431 A | 2/1972 | Plumer | |
| 3,712,516 A * | 1/1973 | Stamets et al. | 222/326 |
| RE28,120 E | 8/1974 | Plumer | |
| 3,877,610 A | 4/1975 | Dickey | |
| 3,980,209 A | 9/1976 | Collar | |
| 3,983,947 A | 10/1976 | Wills et al. | |
| 3,987,939 A | 10/1976 | Pedone, Jr. et al. | |
| 4,171,072 A | 10/1979 | Davis, Jr. | |
| 4,215,802 A | 8/1980 | Ornsteen | |
| 4,284,213 A | 8/1981 | Lee | |
| 4,299,336 A | 11/1981 | Studer | |
| 4,340,154 A | 7/1982 | VanManen | |
| 4,376,498 A | 3/1983 | Davis, Jr. | |
| 4,382,530 A | 5/1983 | Calisto | |

(Continued)

FOREIGN PATENT DOCUMENTS

DE    2036423    3/1971

(Continued)

OTHER PUBLICATIONS

Brandywine Associates, "Dispensing and Mixing Equipment for Adhesives and Chemicals", www.staticmixerdispenser.com/index, Feb. 10, 2003, 3 page printout.

(Continued)

*Primary Examiner*—Joseph A. Kaufman
(74) *Attorney, Agent, or Firm*—Harness, Dickey & Pierce, P.L.C.

(57) ABSTRACT

A cordless device for dispensing a viscous material including housing components for a product cartridge, a DC motor, an air pump, and a rechargeable battery. The device has a pressure limiting switch that maintains a pre-determined pressure of compressed air in a gas enclosure. A manually actuated trigger, when depressed, is adapted to open a flow valve allowing the device to forcefully dispense the viscous material from the product cartridge.

16 Claims, 2 Drawing Sheets

U.S. PATENT DOCUMENTS

| | | |
|---|---|---|
| 4,386,717 A | 6/1983 | Koob |
| 4,426,022 A | 1/1984 | Lang et al. |
| 4,441,629 A | 4/1984 | Mackal |
| 4,453,651 A | 6/1984 | Braithwaite et al. |
| 4,461,454 A | 7/1984 | Vadnais |
| 4,637,531 A | 1/1987 | Olsson |
| 4,685,595 A | 8/1987 | Segatz |
| 4,844,301 A | 7/1989 | Juillet |
| D303,914 S | 10/1989 | Hinden et al. |
| 4,925,061 A | 5/1990 | Jeromson, Jr. et al. |
| 4,957,225 A | 9/1990 | Childers |
| 4,986,444 A | 1/1991 | Corso |
| 5,058,769 A | 10/1991 | Kurtz |
| D321,309 S | 11/1991 | Myers |
| 5,076,473 A | 12/1991 | Steiner |
| 5,104,013 A | 4/1992 | Hawley |
| 5,181,636 A | 1/1993 | Anderson et al. |
| 5,203,507 A | 4/1993 | Matthews |
| D342,654 S | 12/1993 | Jens |
| D343,103 S | 1/1994 | Bunce |
| 5,297,697 A | 3/1994 | Boring |
| 5,353,971 A | 10/1994 | Vaziri |
| 5,361,941 A | 11/1994 | Parekh et al. |
| D357,392 S | 4/1995 | Kimpel et al. |
| 5,450,988 A | 9/1995 | Jerdee |
| 5,492,249 A | 2/1996 | Beach |
| 5,503,307 A * | 4/1996 | Wilson et al. ............... 222/326 |
| 5,514,135 A * | 5/1996 | Earle .......................... 606/93 |
| 5,535,925 A | 7/1996 | Hinden et al. |
| 5,556,009 A | 9/1996 | Motzko |
| 5,573,148 A | 11/1996 | Poole et al. |
| 5,595,327 A | 1/1997 | Dentler et al. |
| 5,785,211 A * | 7/1998 | Tieskoetter ................ 222/396 |
| 5,833,099 A | 11/1998 | Boaz et al. |
| 5,887,765 A | 3/1999 | Broesamle |
| 6,022,504 A | 2/2000 | Boaz et al. |
| 6,032,830 A | 3/2000 | Brown |
| 6,039,223 A | 3/2000 | Damask |
| 6,062,428 A | 5/2000 | Callahan |
| 6,301,788 B1 | 10/2001 | Webster |
| 6,316,911 B1 | 11/2001 | Moskowitz et al. |
| 6,488,180 B1 | 12/2002 | Bayat |
| 6,551,066 B2 | 4/2003 | Saylor et al. |
| 6,672,489 B1 | 1/2004 | Huang |
| 2002/0108971 A1 | 8/2002 | Lafond |
| 2002/0145014 A1 | 10/2002 | Harris |
| 2003/0037445 A1 | 2/2003 | Fey et al. |
| 2003/0115995 A1 | 6/2003 | Hofmann et al. |
| 2003/0230316 A1 | 12/2003 | Glucksman et al. |
| 2004/0074927 A1 | 4/2004 | Lafond |
| 2005/0247740 A1 * | 11/2005 | Puzio ......................... 222/389 |

FOREIGN PATENT DOCUMENTS

| | | |
|---|---|---|
| DE | 2944969 | 5/1980 |
| DE | 3409724 | 9/1985 |
| DE | 3526141 | 2/1986 |
| DE | 3526142 | 2/1986 |
| DE | 3920694 | 1/1991 |
| DE | 9419733.4 | 6/1995 |
| EP | 0290259 | 11/1988 |
| GB | 2162902 | 2/1986 |
| GB | 2162903 | 2/1986 |
| JP | 56-089865 | 7/1981 |
| JP | 62-011571 | 1/1987 |
| JP | 64-038164 | 2/1989 |
| JP | 02-144168 | 6/1990 |
| JP | 06-000428 | 1/1994 |
| JP | 06-099122 | 4/1994 |
| JP | 09-024981 | 1/1997 |
| JP | 2001-315864 | 11/2001 |

OTHER PUBLICATIONS

C.R. Laurence Co. Inc. (CRL), "CRL Introduces New Sealant and Caulking Gun Duo", USGlass, Metal & Glazing, Mar. 2001, p. 65.

Essex ARG, "EssexPak System Saves Time and Money", Glass Digest, May 15, 2001, p. 57.

TAH Industries, "Cartridge Systems", www.tah.com/display, Feb. 10, 2003, 1 page printout.

* cited by examiner

CORDLESS DC CAULK GUN

FIELD OF THE INVENTION

The present invention relates to viscous product dispensing devices; and more particularly, to an electrically powered system that uses a DC motor and an air pump to pressurize the dispensing device.

BACKGROUND OF THE INVENTION

In general, many portable pressure driven viscous product dispensing devices receive an input of relatively high pressure gas which is used to output a viscous product at a relatively low pressure. The dispensing devices typically regulate the high pressure gas using a pressure regulator. In this way, a source of high pressure gas can be used to drive devices that require only a fraction of the high pressure to operate properly. Exemplary sources of high pressure gas include, for example, tanks of compressed air, aerosol containers and commercially available $CO_2$ gas cartridges.

Unfortunately, pressurized containers such as $CO_2$ gas cartridges cannot be shipped via standard air shipment, therefore complete product packages cannot be easily shipped from the manufacturer for retail sales. Moreover, the cost of pressure regulators and replacement pressurized gas sources can become significant in relation to the overall cost of the device into which it is incorporated. This can be true, for example, in relation to dispensing devices for dispensing a viscous product from a viscous product cartridge. Such viscous product cartridges are commonly used in association with adhesives, caulks and other sealants. During extended periods of use, construction workers and other professionals may often require many replacement pressurized gas containers to complete their work. Thus, it has been discovered that a low cost, reliable pressurizing system is desirable to provide a potentially unlimited supply of pressurized gas; particularly for use in cordless dispensing devices for dispensing a viscous product from a viscous product cartridge.

SUMMARY OF THE INVENTION

In accordance with one aspect of the present invention, a device for dispensing a viscous product is provided. The device includes a housing component having a cavity and a dispensing orifice. A movable wall is positioned in the housing cavity and operates to separate a product enclosure from a gas enclosure. An air pump is provided to pressurize the gas enclosure. The air pump is driven by a battery powered DC motor. A power switch is associated with the air pump, and the movable wall is configured to move in response to a force exerted by the pressurized gas enclosure so as to cause the viscous product to dispense from said orifice.

In accordance with another aspect of the present invention, a device for dispensing a viscous product from a viscous product cartridge is provided. The device includes a product cartridge housing component adapted to retain the viscous product cartridge and to cooperate with the viscous product cartridge to form a gas enclosure separated from a product enclosure by a movable wall. An air pump driven by a battery powered DC motor is adapted to pressurize the gas enclosure. In one embodiment, an end cap assembly is provided to retain the air pump and DC motor, and threadedly engages with the product cartridge housing component and cooperates to form the gas enclosure.

In accordance with yet another aspect of the present invention, a further device for dispensing a viscous product from a viscous product cartridge is provided. The device has a housing that includes a first receptacle adapted to receive the viscous product cartridge, and a second receptacle adapted to receive a rechargeable battery. A retaining cap is removably coupled to the housing and adapted to retain an air pump driven by a battery powered DC motor. The retaining cap cooperates with the viscous product cartridge to form a gas enclosure separated from a product enclosure by a movable wall. Compressed air generated from the air pump pressurizes the gas enclosure to cause the movable wall to expand the gas enclosure, thereby contracting the product enclosure and causing viscous product to dispense through a dispensing orifice of the product enclosure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
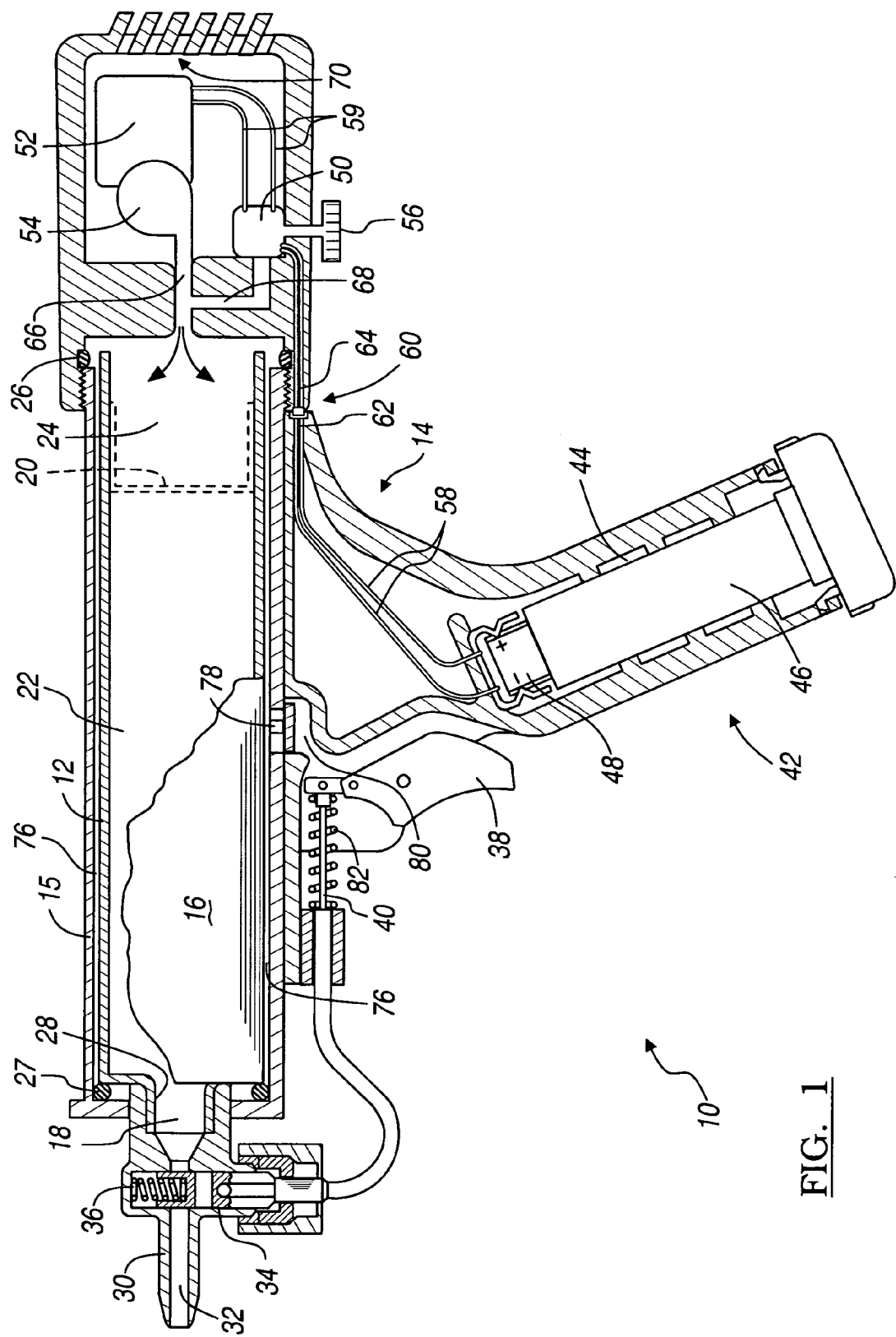
FIG. 1 is a cross-sectional illustration of a dispensing device in accordance with one preferred embodiment of the present invention, shown with a control valve in a closed position.

Referring to FIG. 1, one preferred embodiment of a dispensing device 10 for dispensing a viscous product from a viscous product cartridge 12 is illustrated. As used herein, the phrase "product cartridge", means a container capable of housing a product for shipping and/or storage and for dispensing. Thus, the term "cartridge" does not, in itself, require any specific structural configuration. The dispensing device 10 includes a housing 14 generally molded from a plastic material, or the like. The housing 14 includes a pressure vessel, or upper cavity that operates as a cylindrical product cartridge housing component 15. This product cartridge housing component 15 is adapted to retain the viscous product cartridge 12. In the illustrated embodiments, the cartridge housing component 15 is a cylindrical tubular vessel having a relatively rigid cylindrical wall 16 and is sealed with a removable cap 17 for loading and unloading tubular viscous product cartridges 12. Such tubular cartridges 12 are commonly used in conjunction with or in association with construction adhesives, sealants and caulks.

At one end of such cylindrical tubular product cartridge 12 is a dispensing orifice 18. The dispensing orifice 18 may be provided, for example, by cutting the end of a nozzle (not shown) that is typically provided on many such commercially available viscous product cartridges 12. In addition, it may be necessary to rupture an internal seal (not shown) at the base of the nozzle that seals the dispensing orifice 18 and is often also included in such commercially available product cartridges 12. At the opposite end of the product cartridge 12 is a piston 20 that seals the end of the tube 12. The piston 20 operates as a movable wall that is capable of forcing product from the product enclosure 22 through the dispensing orifice 18 as the piston 20 moves toward the dispensing orifice 18.

As indicated above, the upper portion of the housing 14 operates as a product cartridge housing component 15. The product cartridge housing component 15 is adapted to cooperate with the viscous product cartridge 12 to form a gas enclosure 24 separated from the product enclosure 22 by the movable piston 20. In this embodiment, the removable cap 17 threadedly seals the product cartridge 12 in the product cartridge housing component 15 and uses an O-ring 26 to form a gas enclosure 24 between the housing 14 and the product cartridge 12. The piston 20 or movable wall separates the gas enclosure 24 from the product enclosure 22 formed inside the product cartridge 12. In an alternate embodiment, rather than having a threaded engagement, the removable cap 17 may be otherwise mechanically coupled to the housing component 15, but should be provided with an air tight seal.

Although this embodiment uses product cartridges having a relatively rigid cylindrical wall and a movable piston 20, an alternative product cartridge (not shown) is made of flexible thin-film packaging material. The corresponding product cartridge housing component 15 of this alternative embodiment can optionally use a separate movable piston to dispense the product, similar to the previously described movable piston 20. In yet another alternative embodiment, the gas enclosure can surround the flexible side walls of a press tube. Commonly used press tube type cartridges have a substantially cylindrical shape flexible side wall that tapers to a flat seal on one end with a dispensing orifice on an opposite end. Thus, the flexible side walls can move toward each other under external pressure within the gas enclosure to force product through the dispensing orifice. Accordingly, the separate movable piston and/or the flexible side walls provide the movable wall(s) in these alternative embodiments.

The upper portion of the housing 14 also includes a nozzle housing component 30 which is adapted to seal with a wall 28 of the product cartridge 12 that surrounds the dispensing orifice 18. As indicated above, this dispensing orifice 18 can be provided by trimming the end of a nozzle from a standard caulk or adhesive product cartridge. A rubberized gasket (not shown) may be provided between the nozzle housing component 30 and the wall 28 of the product cartridge 12 to facilitate this seal. As another possible alternative, threads (not shown) may be provided to enable threaded engagement between the wall 28 of the product cartridge 12 and the nozzle housing component 30 to facilitate the seal therebetween.

Figure 2:
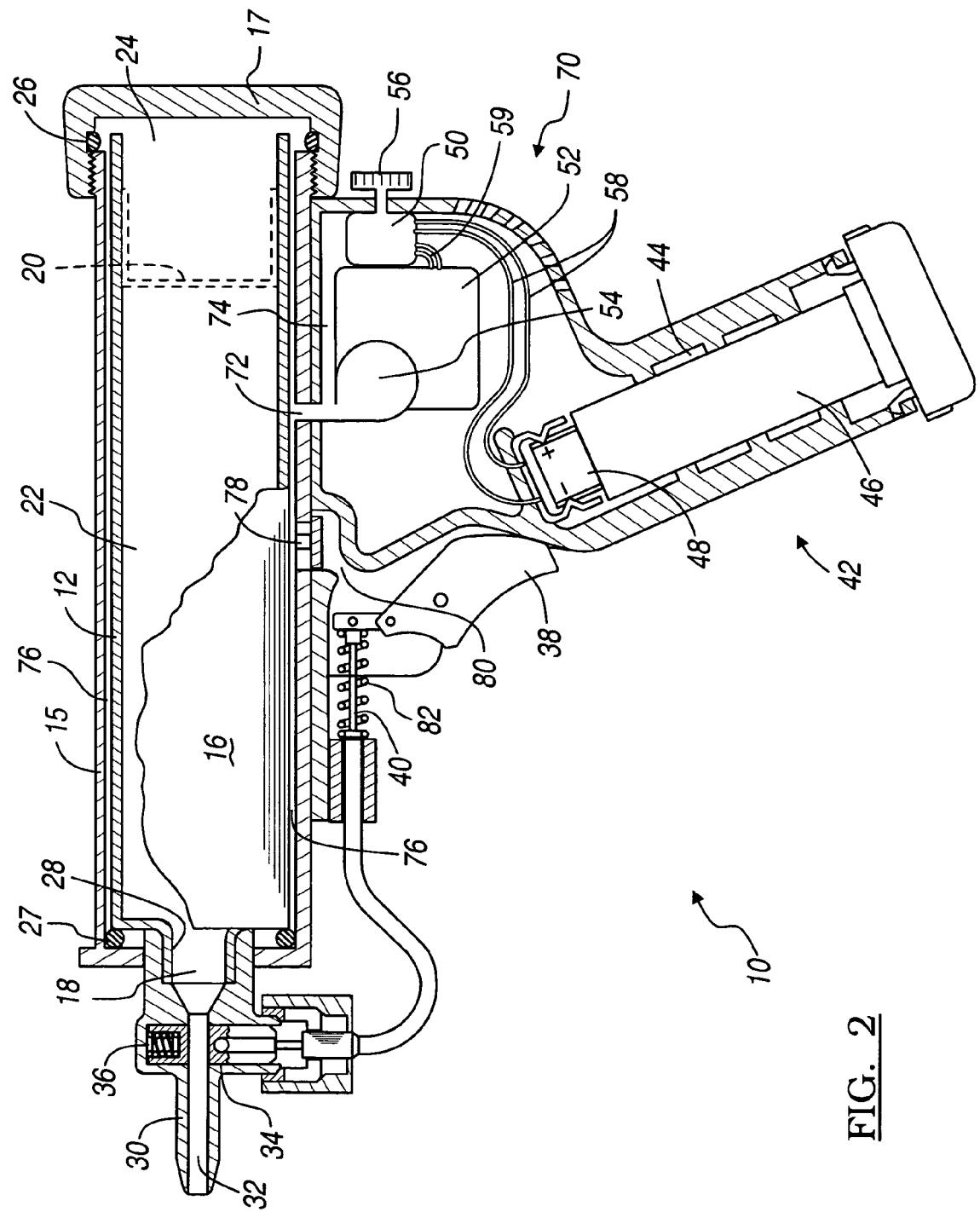
FIG. 2 is a cross-sectional illustration of a dispensing device in accordance with a second preferred embodiment, shown with a control valve in an open position.

The nozzle housing component 30 includes a dispensing passage 32 which is selectively opened and closed by a valve body 34. A spring 36 biases the valve body 34 downwardly into a closed position in which the dispensing passage 32 of the nozzle 30 is sealed as shown in FIG. 1. Actuation of a manually operated dispensing trigger 38 causes a cable 40 to counteract the biasing force of the spring 36 and push the valve body 34 upwardly into a dispensing or open position as seen in FIG. 2. In this open position, product can be dispensed from the product cartridge 12 through the dispensing orifice 18 of the product cartridge 12 and through the dispensing passage 32 of the nozzle housing component 30.

In an alternate embodiment (not shown), the nozzle, including the valve body and dispensing passage, may be integrally provided as part of the product cartridge, rather than as part of the housing. This configuration eliminates the need to seal the dispensing orifice of the product cartridge and the dispensing passage of the device housing together. In contrast, the preferred embodiment described above enables re-use of the nozzle and valve assembly with multiple disposable product cartridges.

As indicated above, a lower portion of the housing 14 of the dispensing device 10 operates as a handle 42 for manually grasping the dispensing device 10. The manually actuated dispensing trigger 38 mentioned above is associated with the handle 42. In addition, the handle provides a battery housing component 44. The battery housing component 44, as depicted, has a substantially circular cross-section area adapted to receive and releasably retain a battery 46. Appropriate electrical connections 48 couple the battery 46 with circuitry known in the art to provide electrical communication with a power switch device 50 that is associated with a DC motor 52 and an air pump 54. The battery 46 may be any type known in the art capable of powering the DC motor 52. Preferably, the battery 46 is rechargeable. It should be understood that while FIGS. 1 and 2 depict a separate DC motor 52 and air pump 54, the invention also includes the use of a combined motor and pump.

In a simplified embodiment, the air pump 54 operates in a start-stop mode where the user actuates an external rotary type component 56 of the power switch 50 to turn on and shut off the DC motor once a desired gas enclosure pressure is reached. In another embodiment, a pressure limit control system is preferably used in conjunction with the DC motor 52. In this regard, the external rotary component 56 can act as both a main power switch and a selective pressure limiting switch. Such limiting switches are quite well known to those skilled in the art, and therefore, the complete structural details of the switch have not been illustrated in the drawings. With a pressure limit control, the user may select a maximum desired pressure and allow the switch to automatically operate the DC motor 52 and air pump 54. With this feature, the DC motor 52 and pump 54 will continue to run until the adjustable pressure switch senses the preset maximum pressure.

As shown in FIG. 1, the battery housing component 44 must provide electrical communication from the battery 46 to the power switch 50 and DC motor 52 which are both disposed in the removable cap 17. Housing 14 preferably contains leads 58 from the battery connections 48 to an exterior area 60 having means for establishing and maintaining good electrical contacts with the removable cap 17 and to the power switch 50 that controls the DC motor 52 and air pump 54 via a second set of leads 59. Preferably, the housing component 44 has a first pair 62 of electrical contacts adapted to engage a second pair 64 of mating contacts on the removable cap 17. As depicted, the main outlet fluid passage 66 from the air pump 54 includes a secondary fluid passage 68 in fluid communication with the power or pressure limiting switch 50 allowing an accurate detection of pressure in the regulated gas enclosure. Typically, the pressure limiting switch 50 uses a diaphragm, or similar means known in the art, to compare the ambient pressure to the relative pressure of the gas enclosure. In addition, a plurality of vents 70 is provided, operable to supply an unlimited amount of ambient air for the air pump 54.

In another embodiment, as shown in FIG. 2, the power or pressure limiting switch 50, DC motor 52, and air pump 54 are disposed in the same housing component as the battery 46. This embodiment eliminates the need for electrical contacts between the housing 14 and the end cap 17. This arrangement similarly has a main outlet fluid passage 72 from the air pump 54 that includes a secondary fluid passage in fluid communication with the power or pressure limiting switch 50 allowing an accurate detection of pressure in the regulated gas enclosure.

In preferred embodiments, the viscous product cartridge 12 is preferably smaller than the cartridge housing component 15 enabling pressurized gas to surround the entire cartridge 12 periphery, thereby filling a gap 76 between the cartridge housing component 15 and the cartridge 12, allowing the pressurized gas to act upon the movable wall 20. The gap, or fluid passage 76 provides fluid communication between the gas enclosure 24 and the pump outlet 72 located in the handle portion 44 of the housing 14.

The main outlet fluid passage 66, 72 combined with the secondary fluid passage 68, 74, housing gap 76 and the gas enclosure 24 define a regulated gas pressure enclosure. Preferably, the pressure is adjustable between about 15 and about 75 psi to accommodate different types of sealant, caulk, and viscous products. More preferably, the pressure is between about 25 and about 50 psi. The pressure should be selected and adjusted accordingly to affect a desirable dispensing rate of product without unnecessarily increasing the pressure in the gas enclosure 24. Alternative embodiments include the use of pressure gauges or other visual indication means as are known to those skilled in the art. An emergency relief valve 78 is also present to release excess gas to the atmosphere via a passage 80 in the event a pressure in the regulated gas pressure enclosure reaches a threshold, or maximum value. It should be understood that the placement of the emergency relief valve 78 will vary depending upon the housing design of the device 10.

Operation of the dispensing device 10 involves locating a product cartridge 12 in the product cartridge retaining housing compartment 15. As previously described, this creates a gas enclosure 24 separated from a product enclosure 22 by a movable wall 20. The device is turned on, and as pressure within the gas enclosure 24 increases, the gas pressure therein generates a force that acts upon the face of the piston 20. Once the pressure reaches a pre-determined value, the dispensing device 10 is ready for use. The user can manually engage the dispensing trigger 38 which causes the cable 40 to counteract the biasing force of a spring 36 and push the valve body 34 to the dispensing position, allowing the release of viscous product from the tip of the dispensing passage 32. The dispensing trigger 38 is biased to a closed position by a spring 82. The dispensing trigger 38 is connected to the nozzle valve 34 to open the valve upon manual actuation. As the piston 20 begins to move, the volume of the gas enclosure 24 expands, reducing the volume of the product enclosure 22 and dispensing product from the dispensing passage 32. Upon release of the dispensing trigger 38, the discharge valve 34 moves to its closed position and product is no longer dispensed.

During the dispensing operation, the increase in size of the gas enclosure 24 causes the pressure level within the overall regulated gas pressure enclosure to fall. If the pressure level falls sufficiently, or below a pre-determined value, the pressure limiting switch will permit activation the DC motor 52 and air pump 54 and subsequently interrupt operation of the DC motor 52 when the pressure reaches or exceeds the predetermined value. If the device 10 is not equipped with such a switch, the user will need to re-pressurize the system by manually actuating the power switch for either a designated time period or until an indicator indicates a suitable operating pressure.

Only a small number of the many possible alternatives are described above. Many additional modifications and alternatives beyond those described above, may be envisioned by those skilled in the art. For example, it should be understood that the pressurizing trigger and pressure limiting switch may be disposed at other convenient locations on the handle portion of the housing. Additionally, it may be desirable to optimize the locations of the battery, motor and air pump to balance weight or provide a more ergonomic design. Thus, the description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device for dispensing a viscous product, the device comprising:
 a housing component having a cavity and a dispensing orifice;
 an air pump powered by a DC motor and adapted to pressurize a gas enclosure;
 a battery which powers said DC motor;
 a power switch associated with said air pump;
 and a movable wall positioned in said cavity and adapted to separate a product enclosure from said gas enclosure;
 wherein said movable wall is configured to move in response to a force exerted by said pressurized gas enclosure so as to cause the viscous product to dispense from said orifice; and
 a product dispensing valve associated with said dispensing orifice and a manually-actuated trigger adapted to move said valve between an open position and a closed position.

2. A device for dispensing a viscous product according to claim 1, wherein said end cap assembly further comprises a first pair of electrical contacts adapted to engage a second and mating pair of electrical contacts to provide electrical communication between said battery and said DC motor.

3. A device for dispensing a viscous product according to claim 1, further comprising a pressure limiting switch in fluid communication with said gas enclosure and adapted to permit operation of said air pump when a pressure in said gas enclosure is below a pre-determined value and to interrupt operation of said air pump when a pressure in said gas enclosure is above a pre-determined value.

4. A device for dispensing a viscous product according to claim 3, wherein said pressure limiting switch is adjustable and said pre-determined value is between about 15 and about 75 psi.

5. A device for dispensing a viscous product according to claim 1, wherein said battery is releasably attached to said housing component.

6. A device for dispensing a viscous product from a viscous product cartridge, the device comprising:
 a product cartridge housing component adapted to retain the viscous product cartridge and to cooperate with the viscous product cartridge to form a gas enclosure separated from a product enclosure by a movable wall;

an air pump powered by a DC motor and adapted to pressurize said gas enclosure; a battery operable to power said DC motor;

a power switch associated with said air pump; and a removable end cap assembly adapted to retain said air pump and DC motor, wherein said end cap assembly is further adapted to threadedly engage said product cartridge housing component and cooperates to form said gas enclosure.

7. A device for dispensing a viscous product according to claim 6, further comprising a product dispensing valve associated with a dispensing orifice of the viscous product cartridge and a manually-actuated trigger adapted to move said valve between an open position and a closed position.

8. A device for dispensing a viscous product according to claim 6, wherein said end cap assembly further comprises a first pair of electrical contacts adapted to engage a second and mating pair of electrical contacts to provide electrical communication between said battery and said DC motor.

9. A device for dispensing a viscous product according to claim 6, further comprising an inlet in sealed fluid communication with said gas enclosure and adapted to permit transfer of air from said air pump to said gas chamber.

10. A device for dispensing a viscous product according to claim 6, further comprising a main handle assembly adapted to retain said battery and said air pump powered by a DC motor.

11. A device for dispensing a viscous product according to claim 6, further comprising a pressure limiting switch in fluid communication with said gas enclosure and adapted to disengage said air pump at a pre-determined pressure.

12. A device for dispensing a viscous product according to claim 11, wherein said pressure limiting switch is adjustable to regulate a maximum pressure in said gas enclosure between about 15 to about 75 psi.

13. A device for dispensing a viscous product from a viscous product cartridge, the device comprising:

a housing;

a first receptacle in said housing adapted to receive the viscous product cartridge;

a second receptacle in said housing adapted to receive a rechargeable battery;

and a retaining cap removably coupled to said housing and adapted to retain an air pump powered by a DC motor;

wherein said retaining cap cooperates with the viscous product cartridge to form a gas enclosure separated from a product enclosure by a movable wall, and air from said air pump pressurizes said gas enclosure to cause said movable wall to move so that said gas enclosure expands and said product enclosure contracts, to thereby cause viscous product to dispense through a dispensing orifice of said product enclosure.

14. A device for dispensing a viscous product according to claim 13, further comprising a pressure limiting switch in fluid communication with said gas enclosure and adapted to control operation of said air pump based upon a pressure level of said gas enclosure.

15. A device for dispensing a viscous product according to claim 13, wherein said pressure limiting switch is adjustable and adapted to maintain a maximum pressure in said gas enclosure between about 15 to about 75 psi.

16. A device for dispensing a viscous product according to claim 13, further comprising a product dispensing valve associated with said dispensing orifice, and a manually-actuated trigger adapted to move said dispensing valve between an open position and a closed position.

* * * * *